United States Patent
Chrysos et al.

(10) Patent No.: US 8,677,046 B2
(45) Date of Patent: Mar. 18, 2014

(54) DEADLOCK RESOLUTION IN END-TO-END CREDIT PROTOCOL

(75) Inventors: Nikolaos I. Chrysos, Thalwil (CH); Fredy D. Neeser, Rueschlikon (CH); Kenneth M. Valk, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 21 days.

(21) Appl. No.: 13/570,377

(22) Filed: Aug. 9, 2012

(65) Prior Publication Data
US 2013/0290559 A1 Oct. 31, 2013

Related U.S. Application Data

(63) Continuation of application No. 13/459,548, filed on Apr. 30, 2012.

(51) Int. Cl.
*G06F 13/36* (2006.01)

(52) U.S. Cl.
USPC .......................................... 710/310; 370/235

(58) Field of Classification Search
USPC .................. 710/62, 64–65, 106, 313, 315
See application file for complete search history.

(56) References Cited

U.S. PATENT DOCUMENTS

| | | | |
|---|---|---|---|
| 6,044,406 A | 3/2000 | Barkey et al. |
| 6,735,174 B1 | 5/2004 | Hefty et al. |
| 7,102,999 B1 | 9/2006 | Sindhu et al. |
| 7,619,970 B2 | 11/2009 | Iny |
| 7,852,829 B2 | 12/2010 | Chao et al. |
| 2005/0174942 A1 | 8/2005 | Betker |
| 2011/0261837 A1 | 10/2011 | Velk et al. |

OTHER PUBLICATIONS

Chrysos, et al., "Scheduling in Switches with Small Internal Buffers", IEEE Globecom 2005, pp. 614-619.
Kung, et al., "Credit-Based Flow Control for ATM Networks", IEEE Network Magazine, Mar. 1995; pp. 1-11.
Sancho et al., "Effective Methodology for Deadlock-Free Minimal Routing in InfiniBand Networks", Proceedings of the International Conference on Parallel Processing (ICPP'02); (2002 IEEE) 10 pages.
Bianco, et al., "Performance Analysis of Storage Area Network Switches", 2005 IEEE, 5 pages.
Chrysos, Nikolaos I., "Congestion Management for Non-Blocking Clos Networks"; ANCS'07, Dec. 3-4, 2007, Orlando, Florida, pp. 117-126.
Chrysos et al., "Scheduling in Non-Blocking Buffered Three-Stage Switching Fabrics", IEEE 2006, to appear in the Proceedings of Infocom 2006 Conference, Apr. 23-29, 2006, 13 pages.
Chrysos, Nikolaos I., Thesis "Request-Grant Scheduling for Congestion Elimination in Multistage Networks"; Forth-ICS / TR-388, Apr. 2007, 227 pages.
Cisco Systems, White Paper ""A Day in the Life of a Fibre Channel Frame" Cisco MDS 9000 Family Switch Architecture", Mar. 2006, pp. 1-21.

*Primary Examiner* — Clifford Knoll
(74) *Attorney, Agent, or Firm* — Cantor Colburn LLP; Daniel Morris

(57) ABSTRACT

A method for deadlock resolution in end-to-end credit protocol includes receiving a data frame and determining a number of credits required to transmit the data frame. The method also includes requesting and receiving credits from an end controller and responsively incrementing a credit counter. The method further includes determining if a value of the credit counter is greater than the number of credits required to transmit the data frame. Based on determining that the value of the credit counter is at least the number of credits required, the method includes transmitting the data frame to the end controller and decreasing the value of the credit counter by the number of credits required to transmit the data frame. Based on determining that the value of the credit counter is less than the number of credits required, the method includes transmitting a credit shortage notification to the end controller.

5 Claims, 6 Drawing Sheets

DEADLOCK RESOLUTION IN END-TO-END CREDIT PROTOCOL

CROSS REFERENCE TO RELATED APPLICATIONS

This application is a continuation of U.S. application Ser. No. 13/459,548 filed on Apr. 30, 2012, the entire contents of which are incorporated herein by reference.

BACKGROUND

The present disclosure relates to network management, and more specifically, to deadlock resolution in end-to-end credit protocol.

Server farms, also known as data centers, are becoming more and more utilized. Without proper management, the increased network utilization will reduce the performance of applications that utilize these networks. Scalable high performance switching fabrics are usually "cell-based," meaning that incoming frames are segmented into shorter segments (referred to as packets, or cells) at the ingress side, and reassembled at the egress side of the fabric. These high performance switching fabrics usually perform multi-path routing, and can deliver segments out-of-order to the egress side. The memory that is normally needed to perform reassembly increases with the number of fabric ports and also increases with as the maximum frame size increases. Accordingly, using smaller reassembly buffers, and flow controlling them in a hop-by-hop manner, can easily lead to deadlock.

A protocol that has been used in scalable high performance switching fabrics is an end-to-end credit protocol. Generally, end-to-end credit protocols include a source controller that sends a request to an end-point controller in order to receive permission, or credits, to send packets to the end-point controller. The end-point controller maintains a request counter, where each request corresponds to an appropriately set buffer space unit.

A common problem experienced by typical end-to-end credit protocols is reassembly-induced deadlocks. For example, when an end-point controller grants a number of credits to a source controller and has allocated its entire buffer space to a number of source controllers, but none of the source controllers has enough credits to transmit the packets required to inject into the fabric an entire frame.

SUMMARY

According to one embodiment of the present disclosure, a method for deadlock resolution in end-to-end credit protocol includes receiving, by a processor, a data frame to transmit to an end controller and determining a number of credits required to transmit the data frame to the end controller. The method also includes requesting the number credits from the end controller and receiving one or more credits from the end controller and responsively incrementing a credit counter by one for each credit received from the end controller. The method further includes determining if a value of the credit counter is greater than or equal to the number of credits required to transmit the data frame. Based on determining that the value of the credit counter is at least the number of credits required to transmit the data frame, the method includes transmitting the data frame to the end controller and decreasing the value of the credit counter by the number of credits required to transmit the data frame. Based on determining that the value of the credit counter is less than the number of credits required to transmit the data frame, the method includes transmitting a credit shortage notification to the end controller.

Additional features and advantages are realized through the techniques of the present disclosure. Other embodiments and aspects of the disclosure are described in detail herein and are considered a part of the claimed disclosure. For a better understanding of the disclosure with the advantages and the features, refer to the description and to the drawings.

BRIEF DESCRIPTION OF THE SEVERAL VIEWS OF THE DRAWINGS

The subject matter which is regarded as the disclosure is particularly pointed out and distinctly claimed in the claims at the conclusion of the specification. The forgoing and other features, and advantages of the disclosure are apparent from the following detailed description taken in conjunction with the accompanying drawings in which:

DETAILED DESCRIPTION

Figure 1:
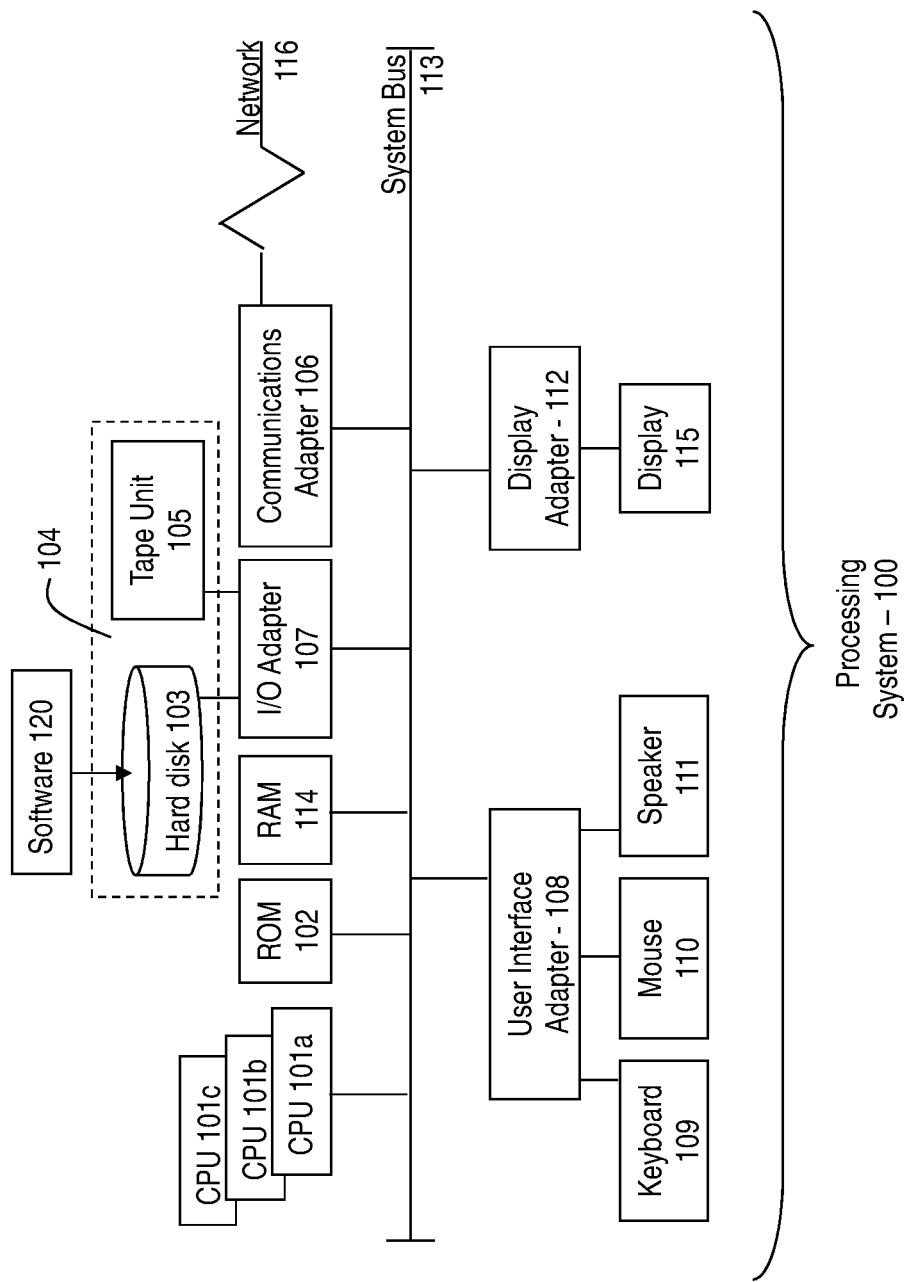
FIG. 1 is a block diagram illustrating one example of a processing system for practice of the teachings herein.

Referring to FIG. 1, there is shown an embodiment of a processing system 100 for implementing the teachings herein. In this embodiment, the system 100 has one or more central processing units (processors) 101a, 101b, 101c, etc. (collectively or generically referred to as processor(s) 101). In one embodiment, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 1 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. Hard disk 103, and tape storage device 105 are collectively referred to herein as mass storage 104. Software 120 for execution on the processing system 100 may be stored in mass storage 104. A network adapter 106 interconnects bus 113 with an outside network 116 enabling data processing system 100 to communicate with other such systems. A screen (e.g., a display monitor) 115 is connected to system bus 113 by display adaptor 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Components Interface (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

Thus, as configured in FIG. 1, the system 100 includes processing capability in the form of processors 101, storage capability including system memory 114 and mass storage 104, input means such as keyboard 109 and mouse 110, and output capability including speaker 111 and display 115. In one embodiment, a portion of system memory 114 and mass storage 104 collectively store an operating system such as the AIX® operating system from IBM Corporation to coordinate the functions of the various components shown in FIG. 1.

Figure 2:
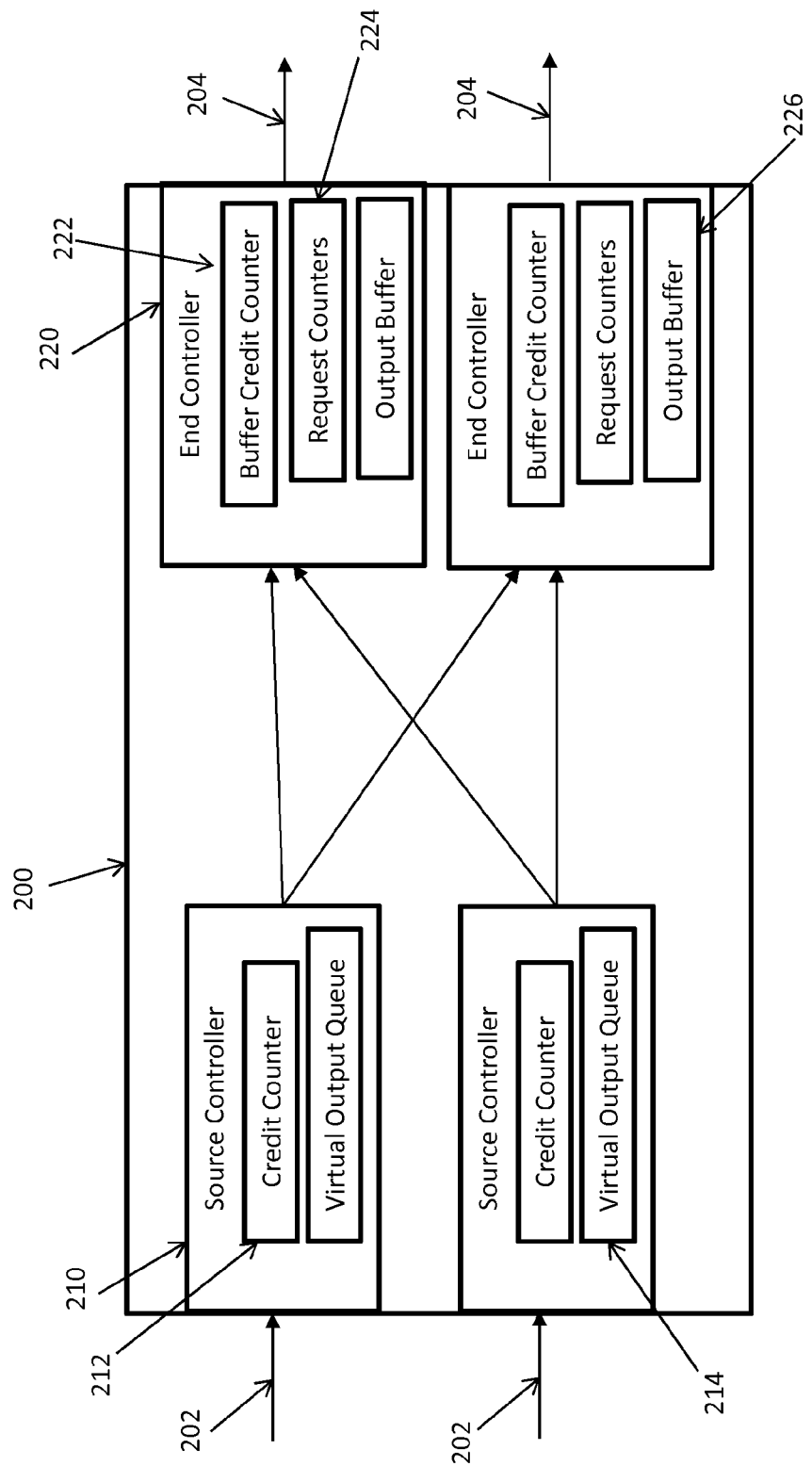
FIG. 2 is a block diagram illustrating a system for deadlock resolution in accordance with an embodiment.

Referring now to FIG. 2, a block diagram of a system for deadlock resolution in accordance with an exemplary embodiment is shown. The system includes a switching fabric 200, which includes a plurality of source controllers 210 located at entry points of the switching fabric 200 and end controllers 220 at its exit points. The source controllers 210 receive incoming frames from incoming links 202 and store the incoming frames in virtual-output-queues 214. The virtual-output-queues 214 are separate data queues for each end controller 220. The source controllers 210 segment the incoming frames into in a number of data packets, and inject the data packets into the switching fabric 200. The end controllers 220 receive data packets, reorder them in output buffers 226 to reconstruct the original data frames, and forward the data frame on outgoing links 204. In exemplary embodiments, the source controllers 210 and end controllers 220 can exchange control messages in addition to the data packets through the switching fabric 200.

In exemplary embodiments, the end controllers 220 maintain a buffer credit counter 222 and a plurality of request counters 224. The buffer credit counter 222 is a counter that is configured to keep track of the available space in the output buffer 226 of the end controller 220. The request counters 224 are configured to keep track of the number of credits that each source controller 210 has requested from the end controller 220. In exemplary embodiments, the end controller 220 keeps track of the available space in its output buffer 226 in fixed increments, or credits. For example, the buffer credit counter 222 can maintain a number of credits that the end controller 220 has available, which would represent the amount of buffer space it has available.

In exemplary embodiments, before a source controller 210 can inject data packets from a data frame into the switching fabric 200, it must request, and be granted, a number of credits from the targeted end-controller 220. The number of credits requested by the source controller 210 is equal to the number of credits requited to transmit all data packets in the data frame. The end controller 220 stores received credit requests in request counters 224 that correspond to each source controller 210, and maintains a buffer credit counter 222 to keep track of the number of slots that are available at its output buffer 226. In one embodiment, in order to issue a grant to one of the credit request received from the source controller 210, the end controller 220 must have at least the number of requested credits available. In other embodiment, in order to issue a grant to one of the credit request received from the source controller 210, the number of available credits required by the end controller 220 must be equal to or greater than a minimum-grant number. For example if a source controller 210 has one hundred frames to send, which each require six credits, the credit request counter 224 could have a value of six hundred. The end controller 220 need not wait for six hundred credits to become available and then grant them all at once. Rather, the end controller 220 will wait until a configured minimum-grant credits are available and then grant either the number of credits requested or the minimum-grant credits.

When the end controller 220 has credits available, it selects a source controller 210 that has a non-zero request counter 224 and grants the source controller 210 a number of credits. In exemplary embodiments, the number of credits granted to the source controller 210 is the minimum of the number of credits that the end controller 220 has available and the number of credits requested by the source controller 210. After granting the credits to the source controller 210, the end controller 220 subsequently updates its buffer credit counter 222 to reflect the credits it has available. In exemplary embodiments, the credits may be conveyed to source controller 210 through a credit-grant message. The source controller 210 maintains the credits granted from the end controller 220 in a credit counter 212. When the source controller 210 receives the credit grant message from end controller 220, it increases its credit counter 212 by the number of credits received.

In exemplary embodiments, the source controller 210 can inject packets from its next frame targeting end controller 220 into the switching fabric 200 only when its credit counter 212 includes enough credits to transmit the entire frame. When this condition is met, the source controller 210 can send all packets from a frame, decrementing its credit counter 212 each time a packet is transmitted. Once the end controller 220 has received these packets, and has reassembled the original frame, it can forward it on the outgoing link 204. After forwarding the frame, the end controller 220 issues an acknowledgement message to the source controller 210 signifying that frame has been received, reassembled, and transmitted on the outgoing link 204.

In exemplary embodiments, when a source controller 210 has credits from an end controller 220, but not enough credits to send all packets belonging to the next in line frame for the end controller 220, the source controller 210 may issue a credit shortage message to the end controller 220. Before issuing a credit shortage message to the end controller 220, the source controller 210 may verify that it does not have any unacknowledged packets it transmitted to the end controller 220 and that it hasn't already notified the end controller 220 of the credit shortage. In exemplary embodiments, the source controller 210 may include a plurality of flags that are used to keep track of credit shortage messages sent to end controllers 220.

In exemplary embodiments, when the end controller 220 receives a credit shortage message from a source controller 210, the end controller 220 stores an identification of the source controller 210 in a list of source controllers 210 with credit shortages. In exemplary embodiments, the end controller 220 may send a credit return command to the source controller 210, instructing the source controller 210 to return the end controller 220 previously issued credits. After sending a credit return command to the source controller 210, the end controller 220 may update its status for the source controller 210 to reflect that the source controller 210 has been sent a credit return command. In response to receiving a credit return command, the source controller 210 sends a credit return message, returning all of the credits it received from the end controller 220 back to the end controller 220. After returning these credits, the source controller 210 will decrement its credit counter 212 by the number of credits it returned.

In exemplary embodiments, when the end controller 220 receives a credit return message from the source controller 210, it increments its buffer credit counter 222 variable by the amount of credits returned from the source controller 210. With the credits it has now available, the end controller 220 may be able to grant one or more requesting source controllers 210 the number of credits requested, allowing the source controllers 210 to inject its next-in-line frame. Thereby avoiding the possible deadlock situation. In exemplary embodiments, when the end controller 220 grants credits to a source controller 210 that has notified the end controller 220 about a credit-shortage, the end controller 220 will always wait for and grant at least a minimum grant number of credits to the source controller 210, even if the current request-counter 224 for that source controller 210 is less than the minimum grant number. For example, the end controller 220 will grant the source controller 210 at least enough credits to send the maximum sized frame. If the end controller 220 still does not have enough credits to grant a requesting source controller 210 the number of credits requested, the credit shortage notifications will persist, and the end controller 220 will send more return credits command messages. In exemplary embodiments, if a source controller 210 has more credits from an end controller 220 that the number of credits required to transmit its unsent frames, the source controller 210 may be configured to return the excess credits back to the end-controller by sending a credit return message.

In exemplary embodiments, when the end controller 220 receives a packet from the source controller 210, the end controller 220 updates the state of the source controller 210 to normal. In another exemplary embodiment, the end controller 220 may update the state of a source controller 210 to normal when the end controller 220 issues a credit grant message to the source controller 210 granting a number of credits that are sufficient for transmitting all packets of a maximum size frame.

Figure 3:
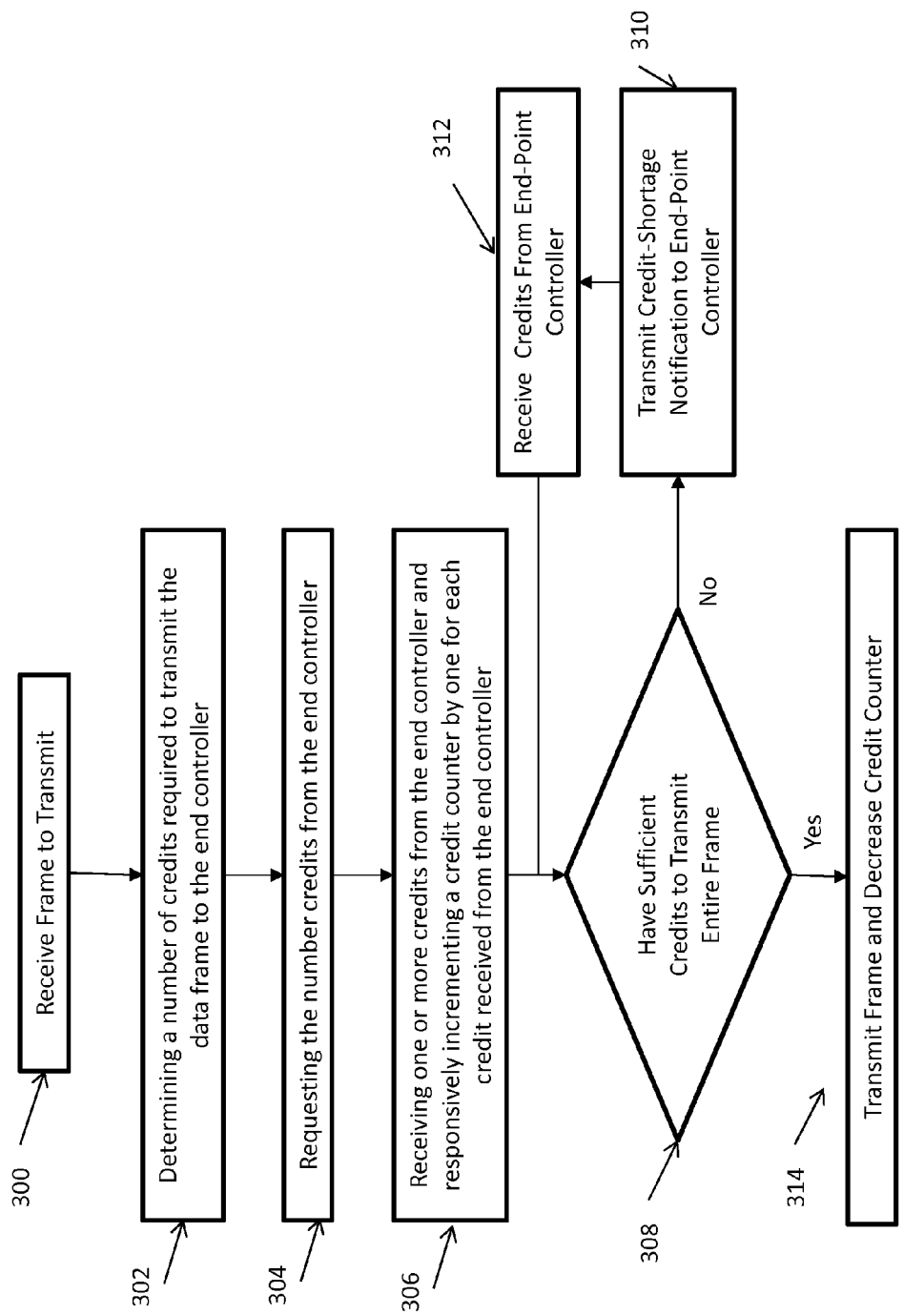
FIG. 3 is a flow chart illustrating a method for operating a source controller in a system for deadlock resolution in accordance with an exemplary embodiment.

Referring now to FIG. 3, a flow chart of a method for operating a source controller in a system for deadlock resolution in accordance with an exemplary embodiment is shown. As shown at block 300, the source controller receives a frame to transmit to an end controller. Next, the source controller determines a number of credits required to transmit the data frame to the end controller, as shown at block 302. As shown at block 304, the source controller requests the number of required credits from the end controller. Next, as shown at block 306, the source controller receives one or more credits from the end controller and responsively increments a credit counter by one for each credit received. At decision block 308, the source controller determines if it has sufficient credits to transmit the entire frame. If the source controller has sufficient credits, it transmits the frame and decreases its credit counter, as shown at block 314. Otherwise, the source controller transmits a credit shortage notification message to the end point controller, as shown at block 310. In exemplary embodiments, the request for additional credits may be performed by transmitting a credit shortage notification message to the end controller. As shown at block 312, the source controller receives additional credits from the end controller. The method then proceeds back to decision block 308.

Figure 4:
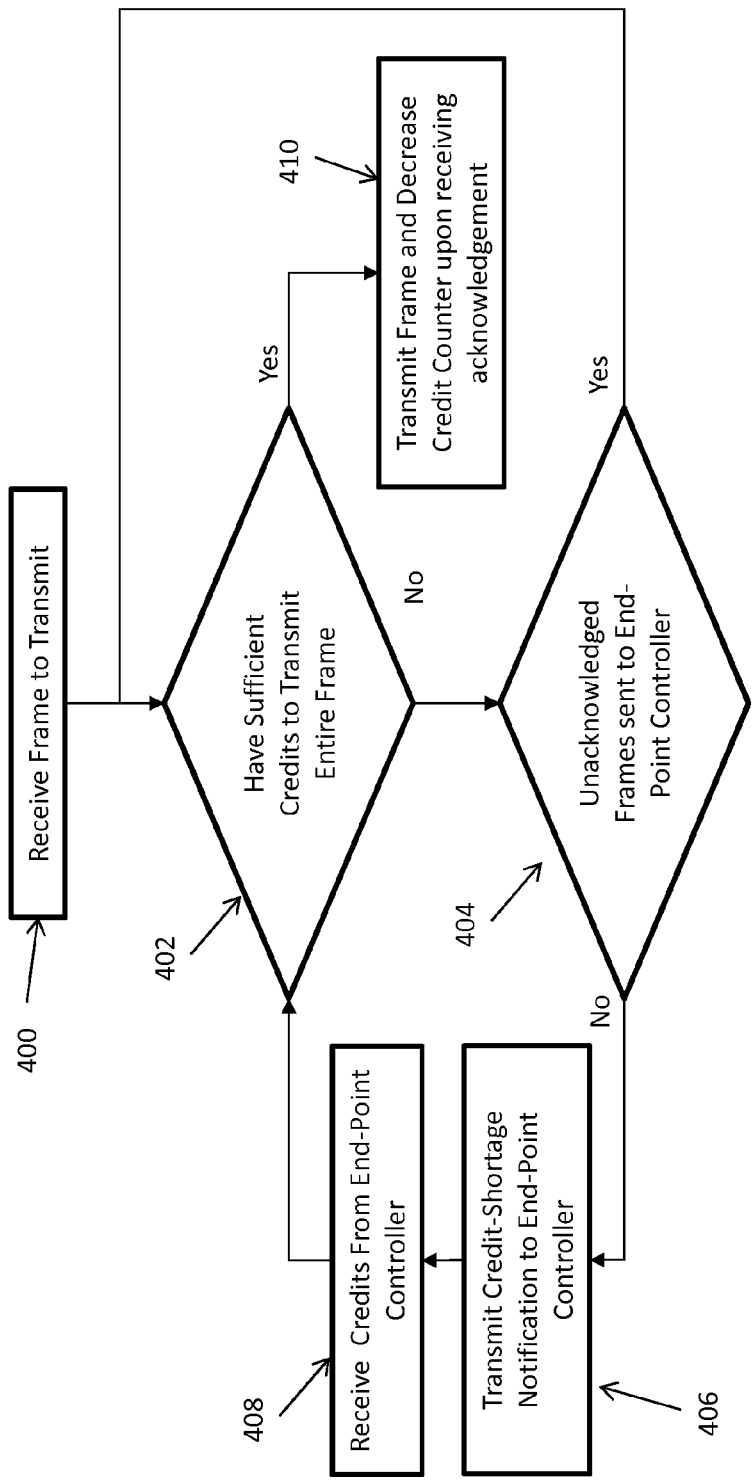
FIG. 4 is a flow chart illustrating another method for operating a source controller in a system for deadlock resolution in accordance with an exemplary embodiment.

Referring now to FIG. 4, a flow chart of another method for operating a source controller in a system for deadlock resolution in accordance with an exemplary embodiment is shown. As shown at block 400, the source controller receives a frame to transmit to an end controller. Next, at decision block 402, the source controller determines if it has sufficient credits to transmit the entire frame. If the source controller has sufficient credits, it transmits the frame and decreases its credit counter, as shown at block 410. Otherwise, the source controller determines if it has any unacknowledged frames that have been transmitted to the end controller, as shown at decision block 404. If the source controller has unacknowledged frames that were transmitted to the end controller, the method proceeds to block 402. If the source controller does not have any unacknowledged frames that were transmitted to the end controller, the source controller transmits a credit shortage notification message to the end point controller, as shown at block 406. As shown at block 408, the source controller receives additional credits from the end controller. The method then proceeds back to decision block 402.

Figure 5:
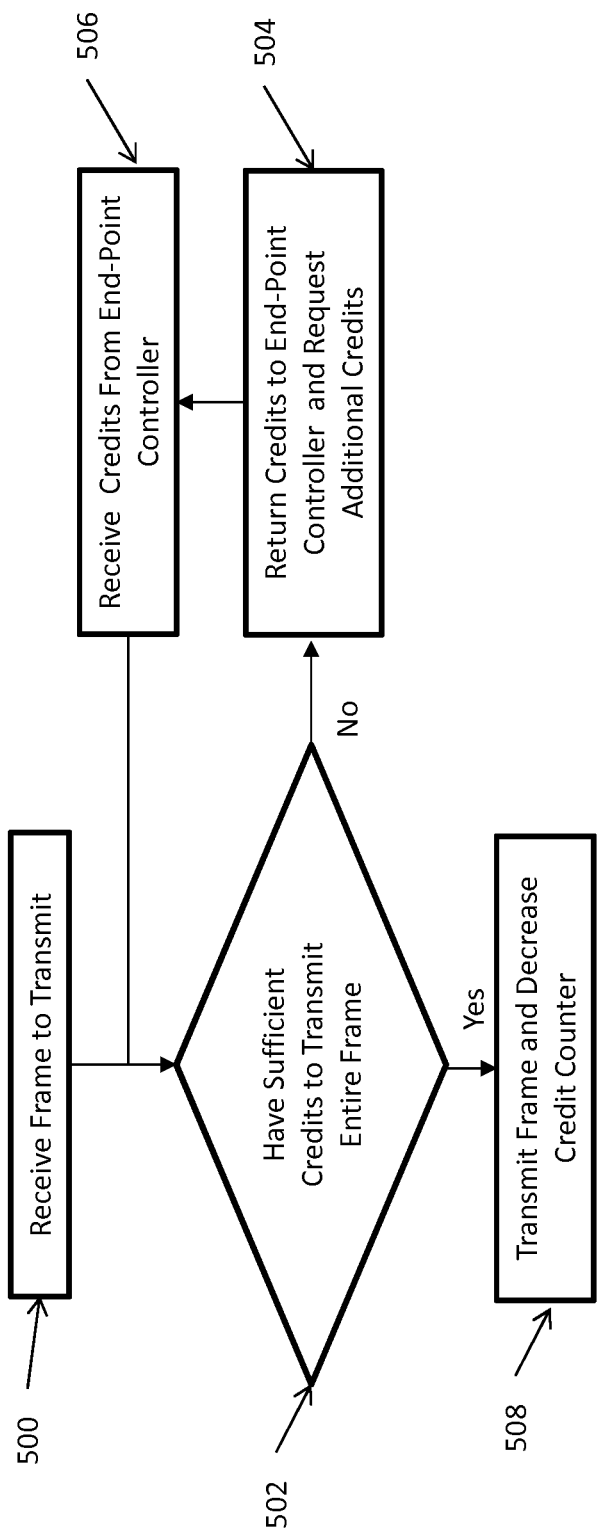
FIG. 5 is a flow chart illustrating a further method for operating a source controller in a system for deadlock resolution in accordance with an exemplary embodiment.

Referring now to FIG. 5, a flow chart of yet another method for operating a source controller in a system for deadlock resolution in accordance with an exemplary embodiment is shown. As shown at block 500, the source controller receives a frame to transmit to an end controller. Next, at decision block 502, the source controller determines if it has sufficient credits to transmit the entire frame. If the source controller has sufficient credits, it transmits the frame and decreases its credit counter, as shown at block 508. Otherwise, the source controller returns the credits it has to the end controller and requests additional credits from the end point controller, as shown at block 504. In exemplary embodiments, the request for additional credits may be performed by transmitting a credit shortage notification message to the end controller and the source controller may return the credits it has to the end controller by sending a credit return message to the end controller. In exemplary embodiments, the credit shortage notification message and the credit return message may be combined into a single message. As shown at block 506, the source controller receives additional credits from the end controller. The method then proceeds back to decision block 502.

Figure 6:
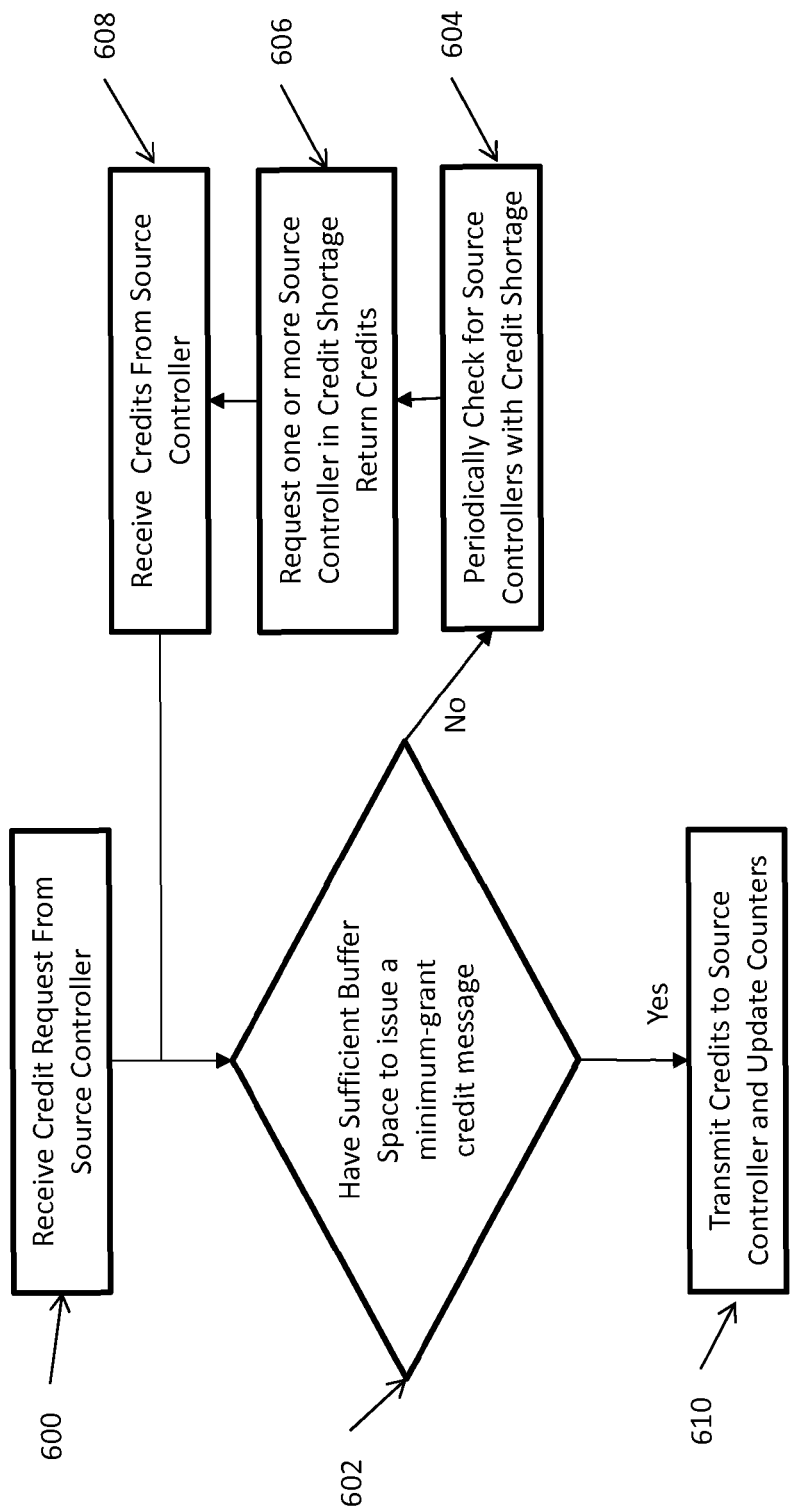
FIG. 6 is a flow chart illustrating a method for operating an end controller in a system for deadlock resolution in accordance with an exemplary embodiment.

Referring now to FIG. 6, a flow chart of a method for operating an end controller in a system for deadlock resolution in accordance with an exemplary embodiment is shown. As shown at block 600, the end controller receives a credit request message form a source controller. Next, at decision block 602, the end controller determines if it has sufficient buffer space to issue at least the minimum-grant credits to the source controller. If the end controller has sufficient buffer space to issue the minimum-grant credits to the source controller, the end controller transmits credits to the source controller and updates its credit counter, as shown at block 602. Otherwise, the end controller periodically checks the list of source controllers to determine if any of the source controllers are in credit-shortage, as shown at block 604. Next, the end controller requests one or more source controllers that have a credit shortage to return credits to the end controller, as shown at block 606. In exemplary embodiments, the request for credits to be returned may be performed by transmitting a credit return command to the source controller. Next, the end controller receives credits form one or more source controllers and updates its credit counter, as shown at block 608. The method then proceeds back to block 602.

In exemplary embodiments, the system for deadlock resolution can be configured to operate with an output buffer size equal to one maximum-size frame. However, for increased performance an output buffer size of a few maximum-size frames may be used. In exemplary embodiments, the credit shortage and credit return messages are only exchanged when deadlock is imminent, thus the protocol does not waste resources under normal operation. In exemplary embodiments, when possible, the message notifications can be piggybacked in other data or control messages.

The terminology used herein is for the purpose of describing particular embodiments only and is not intended to be limiting the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The flow diagrams depicted herein are just one example. There may be many variations to this diagram or the steps (or operations) described therein without departing from the spirit of the disclosure. For instance, the steps may be performed in a differing order or steps may be added, deleted or modified. All of these variations are considered a part of the claimed disclosure.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

While the preferred embodiment to the disclosure had been described, it will be understood that those skilled in the art, both now and in the future, may make various improvements and enhancements which fall within the scope of the claims which follow. These claims should be construed to maintain the proper protection for the disclosure first described.

What is claimed is:

1. A method for deadlock resolution in end-to-end credit protocol, comprising:
    receiving, by a processor, a data frame to transmit to an end controller;
    determining a number of credits required to transmit the data frame to the end controller;
    requesting the number credits from the end controller;
    receiving one or more credits from the end controller and responsively incrementing a credit counter by one for each credit received from the end controller;
    determining if a value of the credit counter is greater than or equal to the number of credits required to transmit the data frame;
    based on determining that the value of the credit counter is at least the number of credits required to transmit the data frame, transmitting the data frame to the end controller and decreasing the value of the credit counter by the number of credits required to transmit the data frame;
    based on determining that the value of the credit counter is less than the number of credits required to transmit the data frame, transmitting a credit shortage notification to the end controller.

2. The method of claim 1, further comprising:
    receiving a credit return command from the end controller; and
    returning one or more credits to the end controller.

3. The method of claim 1, further comprising:
    based on determining that the value of the credit counter is less than the number of credits required to transmit the data frame, returning one or more credits to the end controller and decreasing the value of the credit counter by the number of credits returned to the end controller.

4. The method of claim 1, further comprising:
    based on determining that the value of the credit counter is less than the number of credits required to transmit the data frame, determining if one or more unacknowledged data frames have been transmitted to the end controller.

5. The method of claim 1, further comprising:
    based on determining that the value of the credit counter is less than the number of credits required to transmit the data frame, determining if another credit shortage notification has previously been transmitted to the end controller.

\* \* \* \* \*